(12) United States Patent
Margolis

(10) Patent No.: US 8,509,479 B2
(45) Date of Patent: Aug. 13, 2013

(54) VIRTUAL OBJECT

(75) Inventor: Jeffrey Margolis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 12/485,711

(22) Filed: Jun. 16, 2009

(65) Prior Publication Data

US 2010/0303291 A1   Dec. 2, 2010

Related U.S. Application Data

(60) Provisional application No. 61/182,494, filed on May 29, 2009.

(51) Int. Cl.
*G06K 9/00* (2006.01)

(52) U.S. Cl.
USPC .......................................................... 382/103

(58) Field of Classification Search
USPC .......................................................... 382/103
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Gutierrez et al., "Semantics-Based Representation of Virtual Environments," International Journal of Computer Applications in Technology, (no month available) 2005, 23(2-4), 229-238.

(Continued)

*Primary Examiner* — Alex Liew
(74) *Attorney, Agent, or Firm* — Woodcock Washburn, LLP

(57) ABSTRACT

An image of a scene may be observed, received, or captured. The image may then be scanned to determine one or more signals emitted or reflected by an indicator that belongs to an input object. Upon determining the one or more signals, the signals may be grouped together into a cluster that may be used to generate a first vector that may indicate the orientation of the input object in the captured scene. The first vector may then be tracked, a virtual object and/or an avatar associated with the first vector may be rendered, and/or controls to perform in an application executing on the computer environment may be determined based on the first vector.

20 Claims, 9 Drawing Sheets

(56) References Cited

U.S. PATENT DOCUMENTS

| | | | |
|---|---|---|---|
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,621,858 A * | 4/1997 | Stork et al. | 704/232 |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,057,909 A | 5/2000 | Yahav et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 | 12/2002 | Iwamura | |
| 6,502,515 B2 | 1/2003 | Burckhardt et al. | |
| 6,503,195 B1 | 1/2003 | Keller et al. | |
| 6,512,838 B1 | 1/2003 | Rafii et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,771,277 B2 | 8/2004 | Ohba | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 6,980,671 B2 * | 12/2005 | Liu et al. | 382/118 |
| 7,003,134 B1 | 2/2006 | Covell et al. | |
| 7,006,236 B2 | 2/2006 | Tomasi et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,177 B2 | 5/2006 | Tomasi et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,151,530 B2 | 12/2006 | Roeber et al. | |
| 7,170,492 B2 | 1/2007 | Bell | |
| 7,184,048 B2 | 2/2007 | Hunter | |
| 7,199,301 B2 | 4/2007 | Prittwitz | |
| 7,202,898 B1 | 4/2007 | Braun et al. | |
| 7,222,078 B2 | 5/2007 | Abelow | |
| 7,224,384 B1 | 5/2007 | Iddan et al. | |
| 7,227,526 B2 | 6/2007 | Hildreth et al. | |
| 7,259,747 B2 | 8/2007 | Bell | |
| 7,259,761 B2 | 8/2007 | Shih | |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,391,424 B2 | 6/2008 | Lonsing | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |

| | | | |
|---|---|---|---|
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0207597 | A1 | 10/2004 | Marks |
| 2005/0059488 | A1 | 3/2005 | Larsen et al. |
| 2005/0271252 | A1* | 12/2005 | Yamada ........................ 382/103 |
| 2006/0188144 | A1 | 8/2006 | Sasaki et al. |
| 2006/0239558 | A1 | 10/2006 | Rafii et al. |
| 2007/0013718 | A1 | 1/2007 | Ohba |
| 2007/0060336 | A1 | 3/2007 | Marks et al. |
| 2007/0098222 | A1 | 5/2007 | Porter et al. |
| 2007/0206832 | A1* | 9/2007 | Gordon et al. ................. 382/103 |
| 2007/0216894 | A1 | 9/2007 | Garcia et al. |
| 2007/0260984 | A1 | 11/2007 | Marks et al. |
| 2007/0279485 | A1 | 12/2007 | Ohba et al. |
| 2007/0283296 | A1 | 12/2007 | Nilsson |
| 2007/0298882 | A1 | 12/2007 | Marks et al. |
| 2008/0001951 | A1 | 1/2008 | Marks et al. |
| 2008/0004093 | A1 | 1/2008 | Van Luchene et al. |
| 2008/0026838 | A1 | 1/2008 | Dunstan et al. |
| 2008/0030499 | A1 | 2/2008 | Wanda et al. |
| 2008/0062257 | A1 | 3/2008 | Corson |
| 2008/0076566 | A1* | 3/2008 | Miyamoto ...................... 463/37 |
| 2008/0100620 | A1 | 5/2008 | Nagai et al. |
| 2008/0126937 | A1 | 5/2008 | Pachet |
| 2008/0134102 | A1 | 6/2008 | Movold et al. |
| 2008/0152191 | A1 | 6/2008 | Fujimura et al. |
| 2008/0215972 | A1 | 9/2008 | Zalewski et al. |
| 2008/0215973 | A1 | 9/2008 | Zalewski et al. |
| 2008/0247636 | A1 | 10/2008 | Davis et al. |
| 2008/0252596 | A1 | 10/2008 | Bell et al. |
| 2009/0141933 | A1 | 6/2009 | Wagg |
| 2009/0167679 | A1 | 7/2009 | Klier et al. |
| 2009/0221368 | A1 | 9/2009 | Yen et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2001 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Kato et al., "Virtual Object Manipulation on a Table-Top AR Environment," Augmented Reality, (no month available) 2000, 111-119.

Nini et al., "Real Time Virtualized Real Object Manipulation in an Augmented Reality Environment," Lecture Notes in Computer Science, (no month available) 2005, 3704, pp. 477-486.

Qian et al., "A Gesture-Driven Multimodal Interactive Dance System", IEEE International Conference on Multimedia and Expo, Taipei, Jun. 2004, 3, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

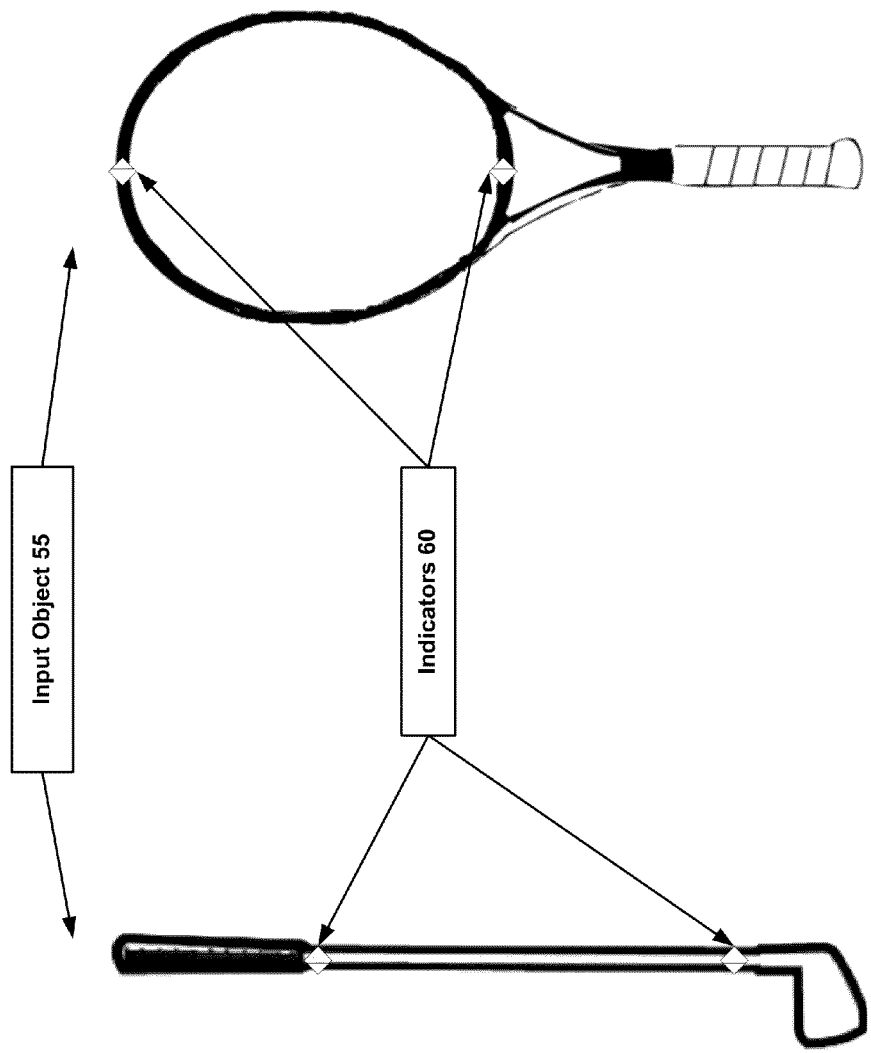

VIRTUAL OBJECT

CROSS-REFERENCE TO RELATED APPLICATIONS

This application claims the benefit 35 U.S.C. §119(e) of U.S. Provisional Patent Application No. 61/182,494 filed May 29, 2009, the disclosure of which is incorporated herein by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for processing image data of a scene that may be used to interpret input that a user provides through the use of an input object. For example, a first image of a scene may be received, captured, or observed. The first image may then be analyzed to determine whether the first image includes an input object that is controlled by a user. For example, the first image may include one or more indicators that belong to the input object. In an example embodiment, these indicators may be grouped together into clusters that may be used to generate a first vector that may indicate the orientation of the input in regards to the scene. According to an example embodiment, a second image may be processed to determine whether a human target, representing the user, may be within the second image. If a human target may be found within the second image, a model of the human target may then be created. This model may be used to generate a second vector that may indicate the orientation of a body part of the model of the user that is associated with the input object. In one embodiment, the first and second vectors may be processed to determine the angle between the virtual object and the body part. The determined angle may then be tracked to, for example, animate an avatar, animate an object controlled by an avatar, and/or control various computing applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A and 6B illustrates example embodiments of input objects that may be used by a user to provide input.

DETAILED DESCRIPTION OF ILLUSTRATIVE EMBODIMENTS

Figure 1A:
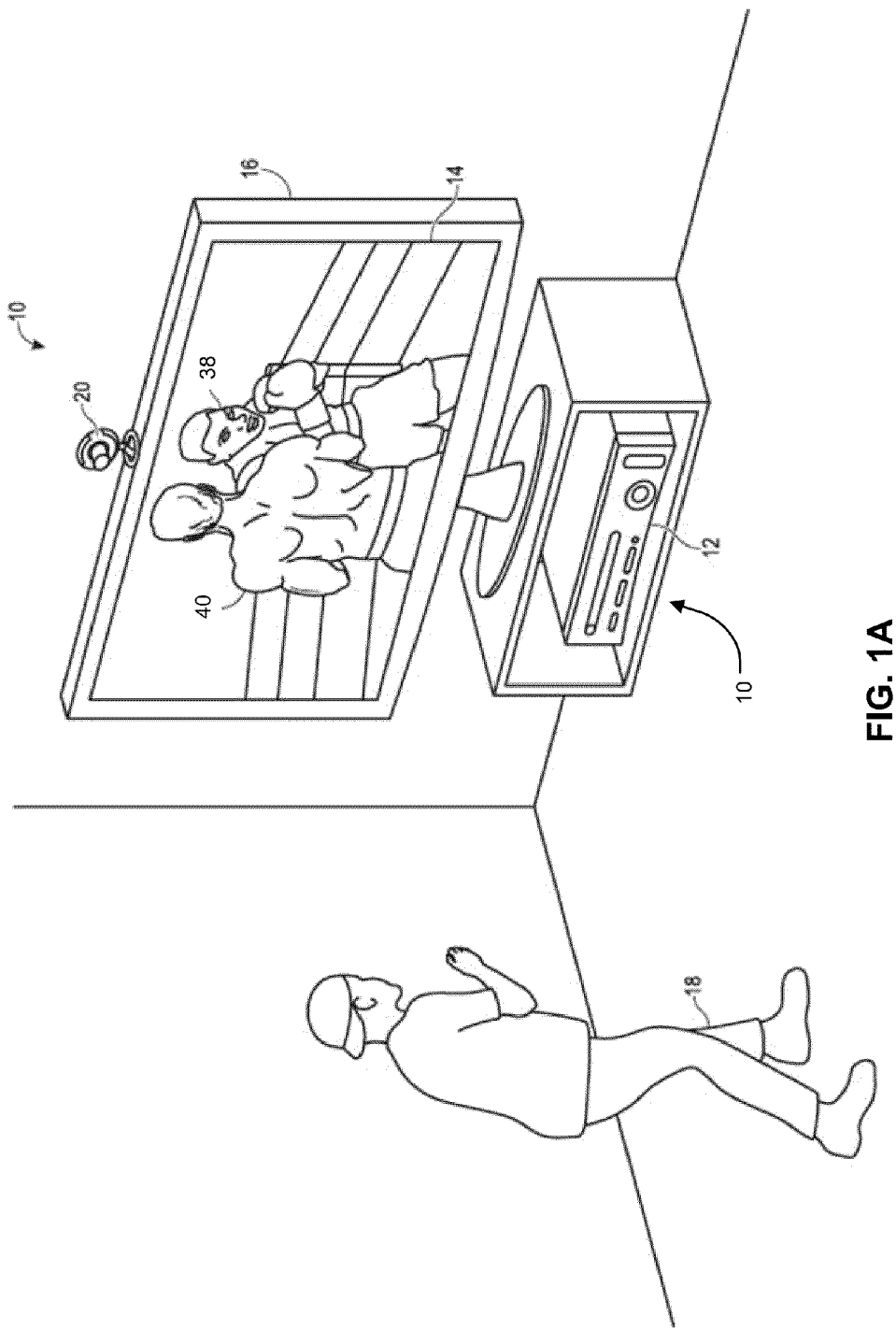
FIGS. 1A and 1B illustrate an example embodiment of a target recognition, analysis, and tracking system with a user playing a game.

As will be described herein, a user may control an application executing on a computing environment such as a game console, a computer, or the like by performing one or more gestures with an input object. According to one embodiment, the gestures may be received by, for example, a capture device. For example, a capture device may observe, receive, and/or capture images of a scene. In one embodiment, a first image may be analyzed to determine whether one or more objects in the scene correspond to an input object that may be controlled by a user. To determine whether an object in the scene corresponds to an input object, each of the targets, objects, or any part of the scene may be scanned to determine whether an indicator belonging to the input object may be present within the first image. After determining that one or more indicators exist within the first image, the indicators may be grouped together into a cluster that may then be used to generate a first vector that may indicate the orientation of the input object in the captured scene.

Additionally, in one embodiment, after generating the first vector, a second image may then be processed to determine whether one more objects in the scene correspond to a human target such as the user. To determine whether a target or object in the scene corresponds to a human target, each of the targets, objects or any part of the scene may be flood filled and compared to a pattern of a human body model. Each target or object that matches the pattern may then be scanned to generate a model such as a skeletal model, a mesh human model, or the like associated therewith. In an example embodiment, the model may be used to generate a second vector that may indicate the orientation of a body part that is associated with the input object. For example, the body part may include an arm of the model of the user such that the arm may be used to grasp the input object. Additionally, after generating the model, the model may be analyzed to determine at least one joint that correspond to the body part that is associated with the input object. The joint may be processed to determine if a relative location of the joint in the scene corresponds to a relative location of the input object. When the relative location of the joints corresponds to the relative location of the input object, a second vector may be generated, based on the joint, that may indicate the orientation of the body part 0

The first and/or second vectors may then be track to, for example, to animate a virtual object associated with an avatar, animate an avatar, and/or control various computing applications. Additionally, the first and/or second vector may be provided to a computing environment such that the computing environment may track the first vector, the second vector, and/or a model associated with the vectors. Additionally, the computing environment may render an avatar and/or a virtual object associated with the first vector and/or the second vector, and/or determine which controls to perform in an application executing on the computer environment based on, for example, the angle.

Figure 1B:
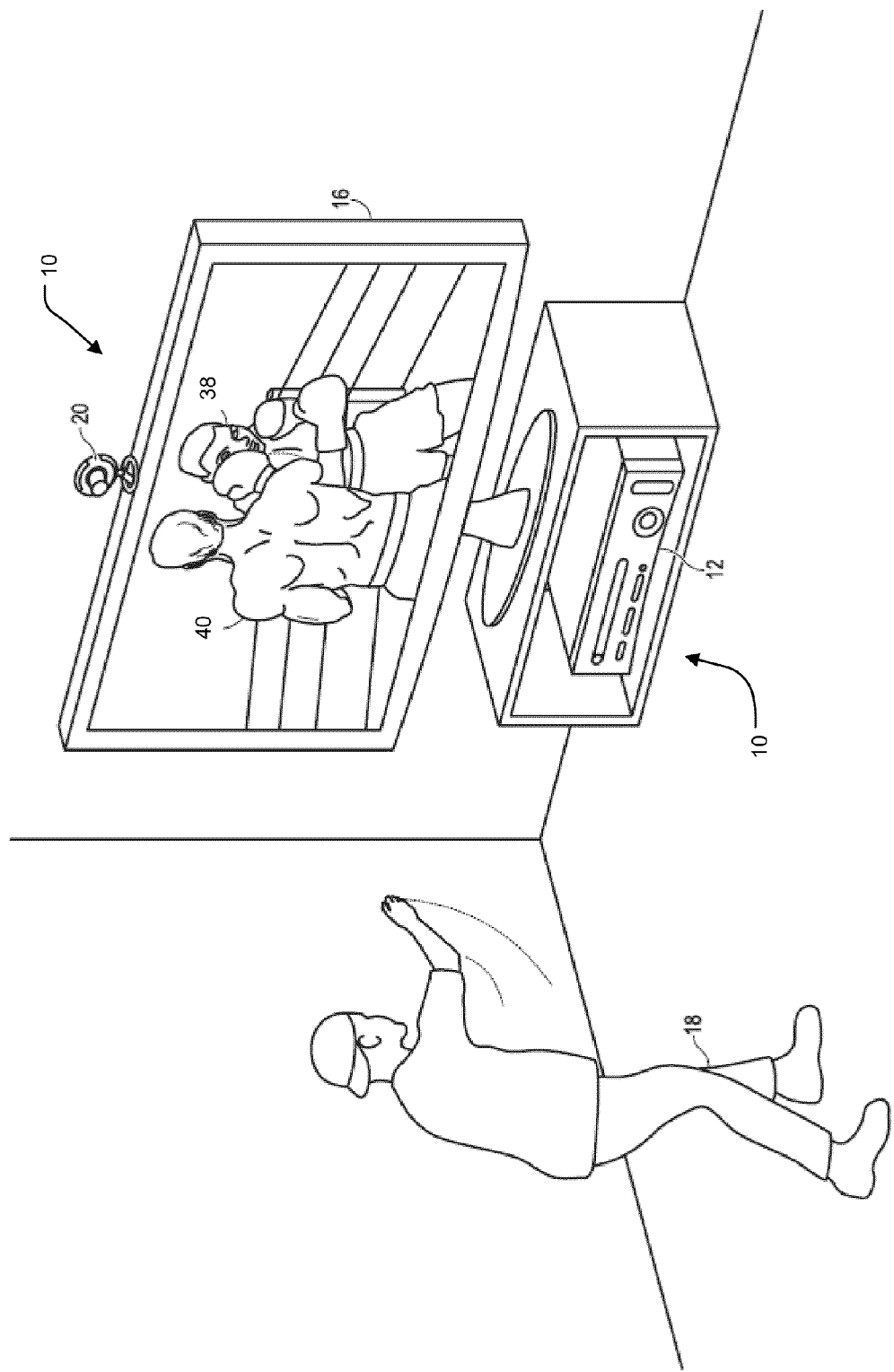

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for accessing a capture device, receiving one or more image from the captured device, determining whether one or more objects within one or more images correspond to a human target and/or an input object, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below. In another embodiment, which will also be described in more detail below, the capture device 20 may further be used to visually monitor one or more input objects, such that gestures performed by the user 18 with the input object may be captured, analyzed, and tracked to perform one or more controls or actions within the application.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computing environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computing environment 12 and the capture device 20 of the target recognition, analysis, and tracking system 10 may be used to recognize and analyze the punch of the user 18 in physical space such that the punch may be interpreted as a game control of the player avatar 40 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an input object. In such embodiments, the user of an electronic game may be holding the input object such that the motions of the player and the input object may be used to adjust and/or control parameters of the game. For example, the motion of a player holding an input object shaped as a racquet may be tracked and utilized for controlling an on-screen racquet in an electronic sports game. In another example embodiment, the motion of a player holding an input object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
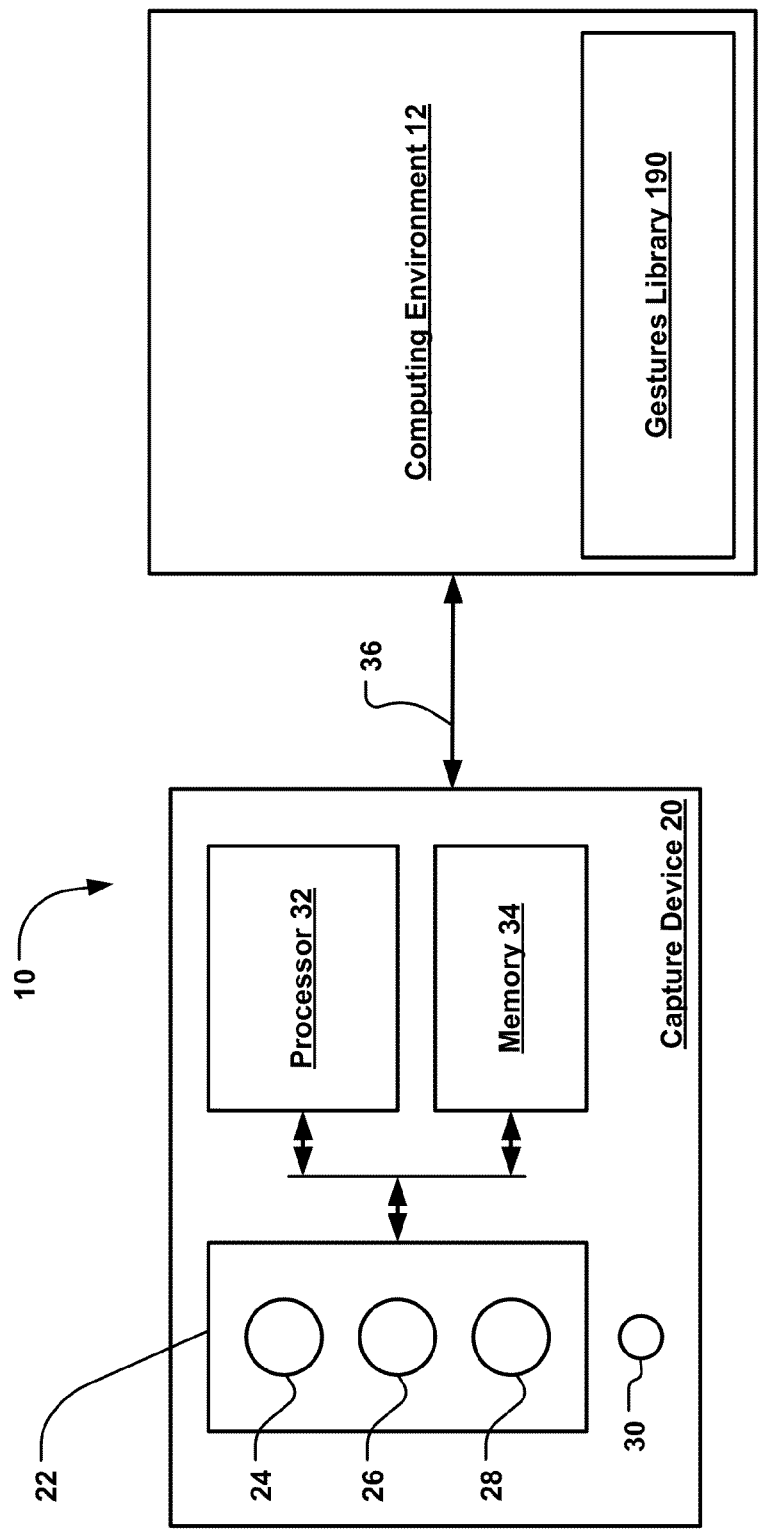
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, may execute instructions including, for example, instructions for accessing a capture device, receiving one or more images from the capture device, determining whether one or more objects within the one or more images correspond to a human target and/or an input object, or any other suitable instruction, which will be described in more detail below.

The capture device 20 may further include a memory component 34 that may store the instructions that may be executed by the processor 32, media frames created by the media feed interface 170, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide depth information, images captured by, for example, the 3-D camera 26 and/or the RGB camera 28 and/or a model such as a skeletal model that may be generated by the capture device 20 to the computing environment 12 via the communication link 36. The computing environment 12 may then use the depth information, captured images, and/or the model to, for example, animate a virtual object based on an input object, animate an avatar based on an input object, and/or control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and/or an input object and to control an application based on the movements.

Figure 3:
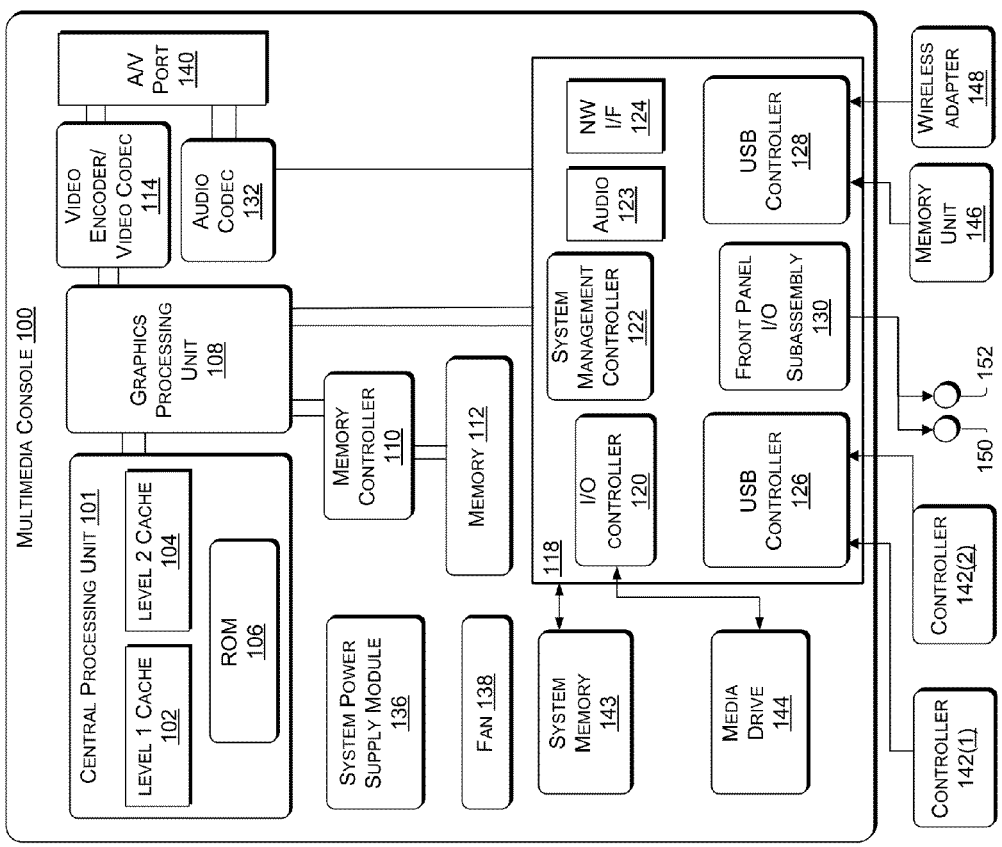
FIG. 3 illustrates an example embodiment of a computing environment that may be used to interpret one or more gestures in a target recognition, analysis, and tracking system.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media included within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to include the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Figure 5:
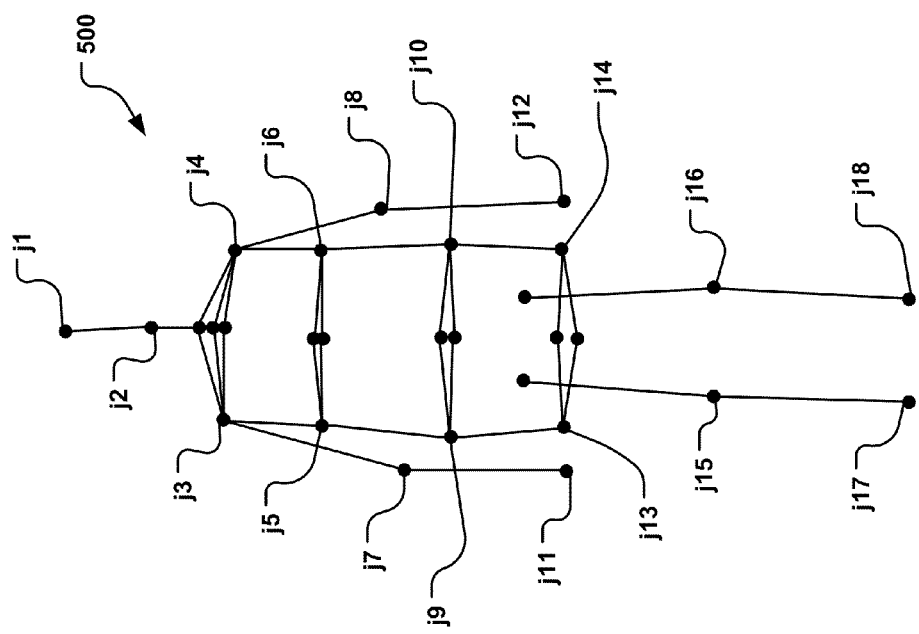
FIG. 5 illustrates an example embodiment of a model representing a scanned human target.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The three-dimensional (3-D) camera 26, and an RGB camera 28, the capture device 20, and the input object 55, as shown in FIG. 5, may define additional input devices for the console 100.

Figure 4:
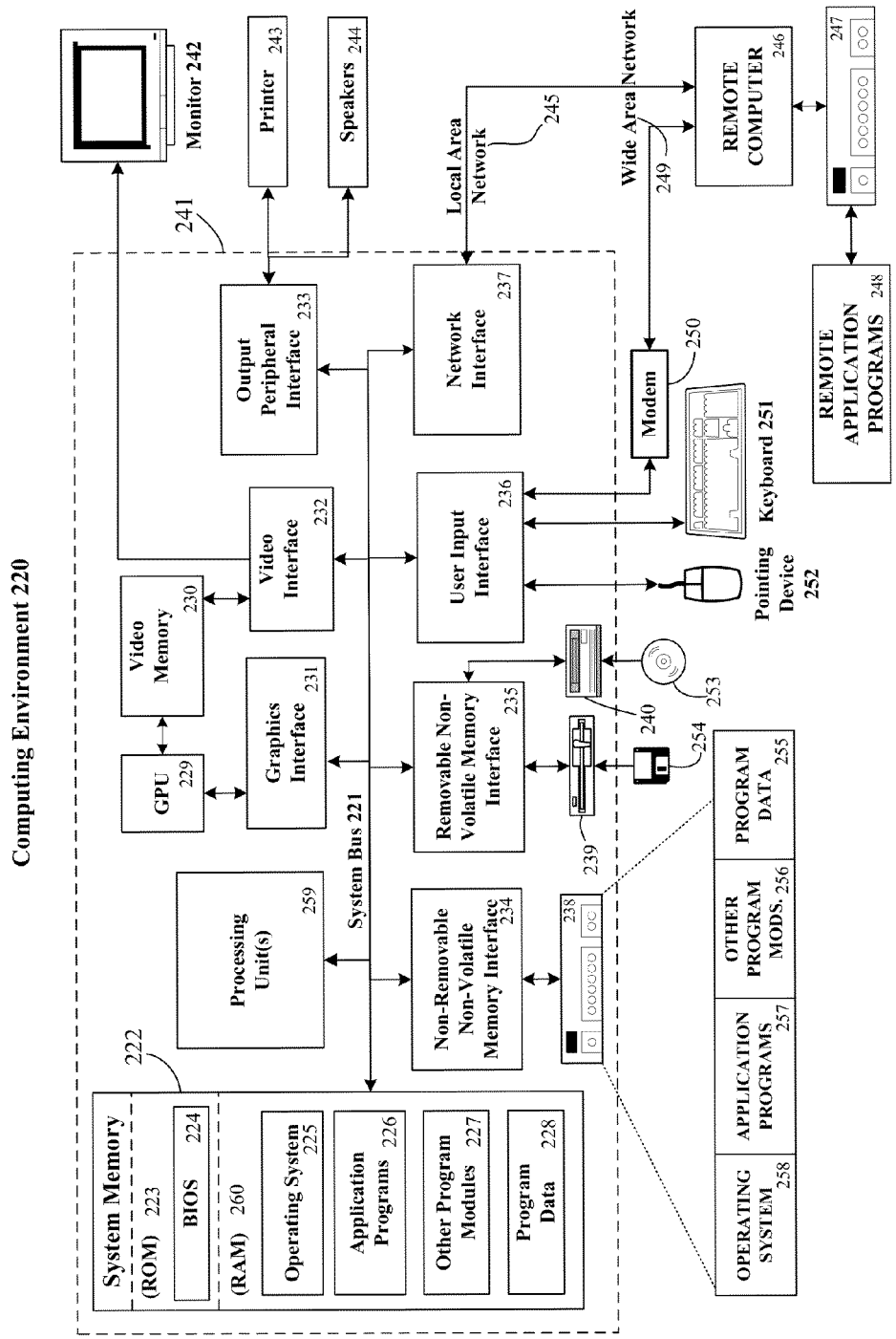
FIG. 4 illustrates another example embodiment of a computing environment that may be used to interpret one or more gestures in a target recognition, analysis, and tracking system.

FIG. 4 illustrates another example embodiment of a computing environment 12 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 12 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), including the basic routines that help to transfer information between elements within computer 241, such as during start-up, is typically stored in ROM 223. RAM 260 typically includes data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 226, other program modules 227, and program data 228. Note that these components can either be the same as or different from operating system 225, application programs 226, other program modules 227, and program data 228. Operating system 225, application programs 226, other program modules 227, and program data 228 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The 3-D camera 26, the RGB camera 28, capture device 20, and input object 55, as shown in FIG. 5, may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

FIG. 5 illustrates an example embodiment of a model 500 representing a scanned human target. According to an example embodiment, the model 500 may include one or more data structures that may represent, for example, the human target found within a second image such as a depth image received in a frame. Each body part may be characterized as a mathematical vector defining joints and bones of the model 500. For example, joints j7 and j11 may be characterized as a vector that may indicate the orientation of the arm that a user, such as the user 18, may use to grasp an input object, such as the input object 55.

As shown in FIG. 5, the model 500 may include one or more joints j1-j18. According to an example embodiment, each of the joints j1-j18 may enable one or more body parts defined there between to move relative to one or more other body parts. For example, a model representing a human target may include a plurality of rigid and/or deformable body parts that may be defined by one or more structural members such as "bones" with the joints j1-j18 located at the intersection of adjacent bones. The joints j1-18 may enable various body parts associated with the bones and joints j1-j18 to move independently of each other. For example, the bone defined between the joints j7 and j11, shown in FIG. 6, corresponds to a forearm that may be moved independent of, for example, the bone defined between joints j15 and j17 that corresponds to a calf.

FIGS. 6A and 6B illustrate example embodiments of an input object 55 that may be used by a user to provide input to a computing environment, such as the computing environment 12. Many computing applications such as computer games, multimedia applications, or the like use controls to allow users to manipulate game characters or other aspects of an application. Typically such controls are input using, for example, controllers, remotes, keyboards, mice, or the like. Such controls may be different than actual game actions or other application actions for which the controls are used. For example, a game control that causes a game character to swing a golf club may not correspond to an actual motion of swinging the golf club.

As shown in FIGS. 6A and 6B, the input object 55 may be designed to represent an object in the physical world that may correspond to an actual game control motion. For example, the input object 55 as shown in FIG. 6A may be designed to resemble a golf club and the input object 55 shown in FIG. 6B may be designed to resemble a tennis racket. In an example embodiment, a user such as the user 18, shown in FIGS. 1A and 1B, may use the input object 55 to interact with, for example, an application such as an electronic game. In such an embodiment, the user of the electronic game may be holding the input object 55 such that the motions of the player and the input object 55 may be used to adjust and/or control parameters of the game. For example, the motion of the user holding the input object 55 may be tracked and used to control an on-screen golf club in an electronic sports game. In another example embodiment, the motion of a player holding an input object may be tracked and for controlling an on-screen weapon in an electronic combat game.

As described above, in an example embodiment, the motion of the input object 55 may be tracked to adjust and/or control parameters of an application. In tracking the input object 55, a visual cue may be used. Such a visual cue may be provided by one or more indicators 60 that may be attached to the input object 55. The indicators 60 may be a reflector, a LED, an LED in the infrared range (IR), an IR emitter, a brightly colored disc, or any other device or object that can emit a visual signal to the capture device.

For example, in one embodiment, the indicators 60 may be an LED that emits light in the IR range. As the indicators 60 emit IR signals, those IR signals may be received by a capture device, such as the capture device 20 described above with respect to in FIGS. 1A-2. In an example embodiment, the capture device may receive the IR signals in a first image such as an IR image of the scene. The first image may be scanned to determine whether the first image includes IR signals emitted by the indicators 60 that may be attached to the input object 55. When IR signals from the indicators 60 may be found within the first image, those signals may then be used to track the movements of the input object 55.

In another embodiment, the indicator 60 may be a reflector used to reflect infrared signals that may be emitted from a capture device such as the capture device 20 shown in FIGS. 1A-2. In emitting signals, the capture device may emit the infrared signals according to a pattern. When the capture device emits the infrared signals, the indicators 60 may reflect the signals back to the capture device such that the capture device may receive and/or capture the reflected signals in a first image. The first image may then be scanned to determine whether signals that were reflected from the indicators 60 may be included within the first image. When signals reflected from the indicators 60 may be found within the first image, those signals may then be used to track the movements of the input object 55.

In another embodiment, the first image may be compared to a pattern used to emit the infrared signals. When a difference between the pattern and the first image may be detected, those differences may be analyzed to determine whether the differences may have been created by the indicators 60. When the differences may be created by the indicators 60, those differences may then be used to track the movements of the input object 55.

Figure 7:
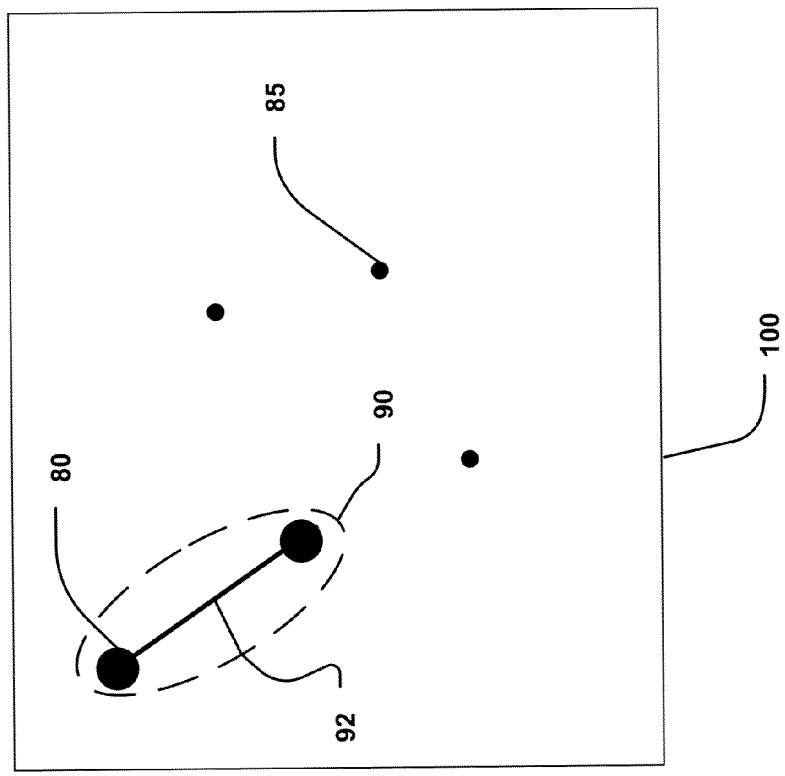
FIG. 7 illustrates an example embodiment of a first image for processing indicators associated with an input object.

FIG. 7 illustrates an example embodiment of a first image 100 that may be processed for indicators such as the indictors 60 described above with respect to FIGS. 6A and 6B. As show in FIG. 7, the first image 100 may include signal 80 from the input object 55 and a false reading 85. According to an example embodiment, the first image 100 may be an IR image, a depth image, a 3-D image, a visual representation of ultrasonic waves, a visual representation of sound, or any other image or visual representation that may be captured by the capture device 20.

The signal 80 that may be included within the first image 100 may be a signal that was emitted and/or reflect from indicators 60 that belong to the input object 55 as shown in FIGS. 6A and 6B. For example, in one embodiment, a capture device such as the capture device 20 described above with respect to FIGS. 1A-2 may emit infrared signals that may be reflected by the indicator 60 back to the capture device. As the capture device captures the scene, the capture device may also capture the signals reflected by the indicators 60 in the first image 100 that may include the signal 80. Thus, according to an example embodiment, the first image 100 may includes the signal 80 that may represent a signal that was emitted and/or reflected from the indicator 60 that belongs to the input object 55 as show in FIG. 6.

In one embodiment, to determine whether the first image 100 includes the signal 80 that have been emitted and/or reflect by the indicator 60 that may be attached to the input object 55, the first image 100 may be scanned to discover bright spots. For example, the first image 100 may be an IR image. In discovering the bright spots within the IR image, the pixels of the first image 100 may be analyzed to determine whether any of the pixels exceed a threshold for IR brightness. This threshold may be set manually, or automatically.

For example, the filtering mechanism may set the threshold according to an average brightness of all the pixels included within the first image 100. Whenever a pixel exceeds the average brightness, that pixel may be marked as a bright spot and may be further analyzed to determine whether the bright spot is the signal 80. In furthering analyzing the pixels, the location of the pixels may be analyzed to determine whether the bright pixels exists within a relatively close location to other bright pixel within the first image 100. If a series of bright pixels exist within a relatively close location to each other, these pixels may indicate the signal 80 and may be grouped together.

In another embodiment, the first image 100 may be a depth image that includes depth information of objects within the scene. In order to determine whether the first image 100 includes the signal 80 that have been emitted and/or reflected by the indicator 60 that belongs to the input object 55, the first image may be scanned to discover areas of the depth image where the depth value of objects cannot be calculated. Because the indicator 60 may flood the first image 100 with a strong signal, such as a large amount of IR light, at a specific location, the first image 100 may lose depth values at that location. By associating the signal 80 with the areas where the first image 100 may have lost depth values, the signal 80 may be determined within the same location as the area without the depth image data.

In yet another embodiment, to determine whether the first image 100 includes the signal 80 that have been emitted and/or reflect by the indicator 60 that belongs to the input object 55, the first image 100 may be compared against a pattern used to emit signals. For example, the capture device may use a structured light to capture depth information. In such an analysis, patterned light (i.e., light displayed as a known pattern such as grid pattern or a stripe pattern) may be projected onto the scene via, for example, an IR light component such as the IR light component 24 described above with respect to FIGS. 1A-2. Upon striking the surface of one or more targets or objects in the scene, the pattern may become deformed in response. As the capture device captures the scene, the capture device 20 also capture the deformation of the pattern in the first image 100. The first image 100 that may include the captured deformations may then be compared against a pattern used to emit signals. When differences between the pattern and the first image 100 may be detected, those differences may be analyzed to determine whether the differences may have been created or caused the indicators 60. In one embodiment, when the differences may be created or caused by the indicator 60, those differences may be marked as the signal 80.

The first image 100 may also include the false reading 85. The false reading 85 may be signals emitted and/or reflect by the input object 55, and/or any object capable of emitting or reflecting signals that cause inaccurate tracking of the input object 55. For example, the false reading 85 may be created by an unexpected reflective surface in the scene, such as a mirror, that may not be associated with the indicator 60 and/or related to the input object 55. In one embodiment, as the capture device captures the scene, the capture device 20 may also capture the signals reflected by the unexpected reflective surface in the scene in the first image 100 such that the capture device may record the signals reflected by the unexpected reflective surface in the scene as the false reading 85. In processing the first image 100, the false reading 85 may be disregarded and/or filtered such that the signal 80 may be more accurately tracked to indicate the orientation of the input device 55 in the captured scene.

To further distinguish the signal 80 from the false reading 85, the signal 80 may be grouped together to create the cluster 90. As shown in FIG. 7, the first image 100 may include one or more of the signals, such as the signal 80, that have been emitted from the indicators 60 that belongs to the input object 55. Upon determining that one or more of the signals may be included within the first image 100, the signals may be grouped into the cluster 90. The cluster 90 may create a relation between the signals such that the signals may be more easily and accurately tracked and may be further distinguished from the false reading 85. For example, in one embodiment, the maximum length of the input object 55 may be know such that the clusters 90 of, for example, the signals 80 may be created based on the maximum length of the input object. That is, in one embodiment, in knowing the maximum length of the input object 55, the cluster 90 may be created such that a relation may not be made to the signals 80 that would result in a relational distance that would exceed the maximum length of the input object 55. In this way, the cluster 90 may be able to further distinguish the signal 80 from the false reading 85.

In another embodiment, upon determining that one or more of the signals, such as the signal 80, may be included within the first image 100, the signals 80 may be the signal 80 may be grouped into a cluster, such as the cluster 90. Because the cluster 90 may create a relation between the signals 80, the relation between the signals may be defined in such a way as to distinguish one input object 55 from another. For example, if the maximum length of an input object in the scene and/or the first image 100 is known, the cluster 90 may be defined such that a relation may not be made to any signal and/or false reading that would result in a relational distance that would exceed the maximum length of the input object. Thus, in one embodiment, in defining the cluster 90, the cluster 90 may be limited to the particular dimensions of the input device and/or the location of the input device within the first image 100 such that the cluster 90 may be able to distinguish between the signal 80 that may have been created by the indicator 60 of two or more input object 55.

Upon determining that the first image 100 includes the signal 80, the first image 100 may be further analyzed to determine the location of the signal 80 within the first image 100. In one embodiment, each of the signals, such as the signal 80, that may be included in the first image 100 may be scanned analyzed to determine the location of the signal within the first image 100. In determining the location of the signal within the first image 100, each signal may be provided with an x any y value. The x and y value may provide a coordinate location of the signal 80 within the first image 100. Additionally, the signal may be provided with a z value that correlates to the brightness, or strength, of the signal.

As demonstrated in FIG. 7, the x, y, and z values of the signal 80 may be used to generate the first vector 92 that may indicate the orientation of the input object 55 in the captured scene. As described above, in one embodiment, after determining that at least one signal such as the signal 80 may be within the first image 100, those signals may be grouped together into a cluster such as the cluster 90. When the cluster 90 has been created, the signals within the cluster may be furthered analyzed to determine the x, y, and z coordinate values for each of the signals. Because the x, y, and z coordinate values may relate to a position within the first image 100, the coordinate values may be used to determine a first vector. In determining a first vector, the signals may be analyzed to determine a vector that may connect substantially all the signals within the cluster 90. In one embodiment, the signals may be scattered in such a manner that a single vector may not be able to include all the signals that are within the cluster 90. In these cases, a first vector may be drawn as a best fit vector to provide a vector estimate that would substantially include all the signals within the cluster 90.

After generating the first vector 92, the first vector 92 may be used to determine the orientation of the input object 55 in the scene. In one embodiment, the first vector 92 may be used to determine a delta height and a delta width. In determining the delta width, the first vector 92 may be analyzed to determine the highest and lowest x coordinates along the first vector 92. Using the highest and lowest x coordinates, the delta width may be calculated by subtracting the lowest x coordinate along the first vector 92 from the highest x coordinate long the first vector 92.

In one embodiment, the real world length of the input object 55 may be know such that the length of the input object 55 may be translated into a known pixel width. By comparing the known pixel length against the delta width, a ratio may be calculated that may be used to determine a yaw angle at which the input object 55 may be leaning to towards or away from the capture device. By further analyzing the first vector 92, a determination may be made as to whether the input object 55 may be leaning towards or away from the capture device by inspecting the highest and lowest signal 80 along the x-axis of the first vector 92. If the highest signal 80 along x-axis of the first vector 92 may be dimmer, or of a weaker signal strength than the lowest signal 80 along the x-axis of the first vector 92, the first vector 92 may indicate that the input object 55 may be leaning away from of the capture device in the scene. Similarly, the angle that may be calculated by comparing the delta width against the known pixel width of the input object 55 may indicate that the angle at which the input object 55 may be leaning is to the left of the capture device 20. If the highest signal 80 along x-axis of the first vector 92 may be the same brightness, or signal strength as the lowest signal 80 along the x-axis of the first vector 92, the first vector 92 may indicate that the input object 55 may neither leaning towards or away from the capture device. Similarly, the angle that may be calculated by comparing the delta width against the known pixel width may indicate that the input object 55 may neither be leaning towards the left or the right of the capture. If the highest signal 80 along the x-axis of the first vector 92 is brighter, or of a stronger signal strength than the lowest signal 80 along the x-axis of the first vector 92, then the first vector 92 may indicate that the input device is leaning toward the capture device. Similarly, the angle that may be calculated by comparing the delta width 83 against the known pixel width of the input object 55 may indicate that the angle at which the input object 55 is leaning is to the right of the capture device 20 in the scene.

Figure 8:
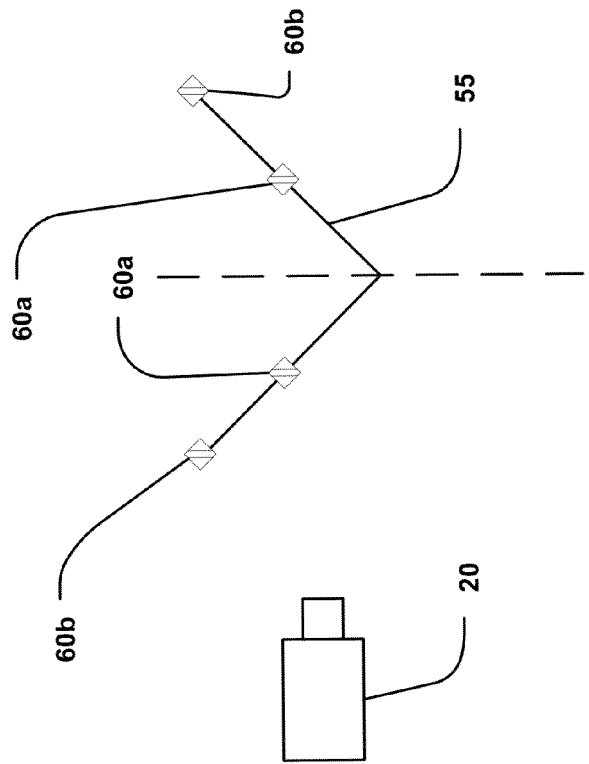
FIG. 8 illustrates an example embodiment of an angle that may be detected to track the input object using the indicators.

For example, if FIG. 8 is a top view of the captured scene, the input object 55 may be a tennis racquet that the user such as the user 18 described above with respect to FIGS. 1A-2 may swing. As the user begins to swing the input device back, the indicator 60a that belongs to the input object 55 may be toward the capture device 20 whereas the indicator 60b may be away from the capture device 20. As the user begins to swing the input device forward, the indicator 60a that belongs to the input object 55 may be away from the capture device 20 whereas the indicator 60b may be toward the capture device 20.

Additionally, the highest signal 80 and the lowest signal 80 along the x-axis may be used to determine a whether the input device may be located on the left side of the user or the right side of the user.

Returning to FIG. 7, in determining the delta height, the first vector 92 may be analyzed to determine the highest and lowest y coordinates along the first vector 92. Using the highest and lowest y coordinates, the delta height may be calculated by subtracting the lowest y coordinate along the first vector 92 from the highest y coordinate long the first vector 92. Upon determining the delta height of the first vector 92, the delta height may also be used to determine the angle at which the input object 55 is learning towards or away from the capture device.

As described above, in one embodiment, the height of the input object 55 may be know and may be translated into a known pixel height. By comparing the known pixel height against the delta height, a ratio may be calculated that can be used to determine an angle at which the input object 55 may be leaning. By further analyzing the first vector 92, a determination may be made as to whether the input object 55 may be leaning toward or away from the capture device 20 by inspecting the highest and lowest signal 80 along y-axis of the first vector 92. If the highest signal 80 along the y-axis of the first vector 92 may be brighter, or of a higher signal strength than the lowest signal 80 along the y-axis of the first vector 92, the first vector 92 may indicate that the top of the input object 55 may be leaning towards the capture device 20. Similarly, the angle that may be calculated by comparing the delta height 82 against the known pixel height of the input object 55 may indicate the angle at which the input object 55 may be leaning towards the capture device 20. If the highest signal 80 along the y-axis of the first vector 92 may be the same brightness, or signal strength as the lowest signal 80 along y-axis of the first vector 92, the first vector 92 may indicate that the top and bottom of the input object 55 may be in-line with each other. Similarly, the angle that may be calculated by comparing the delta height against the known pixel height may indicate that the input object 55 may be perpendicular to the field of vision of the capture device 20. If the highest signal 80 along the y-axis of the first vector 92 may be dimmer, or of a weaker signal strength than the lowest signal 80 along y-axis the first vector 92, the first vector 92 may indicate that the top of the input device may be leaning away from the capture device. Similarly, the angle that may be calculated by comparing the delta height 82 against the known pixel height of the input object 55 may indicate the angle at which the input object 55 may be leaning away from the capture device 20 in the scene.

For example, if FIG. 8 is a side view of the captured scene, the input object 55 may be a tennis racquet that the user such as the user 18 described above with respect to FIGS. 1A-2 may swing. As the user begins to swing the input device back, the indicator 60a that belongs to the input object 55 may be toward the capture device 20 whereas the indicator 60b may be away from the capture device 20. As the user begins to swing the input device forward, the indicator 60a that belongs to the input object 55 may be away from the capture device 20 whereas the indicator 60b may be toward the capture device 20.

Figure 9:
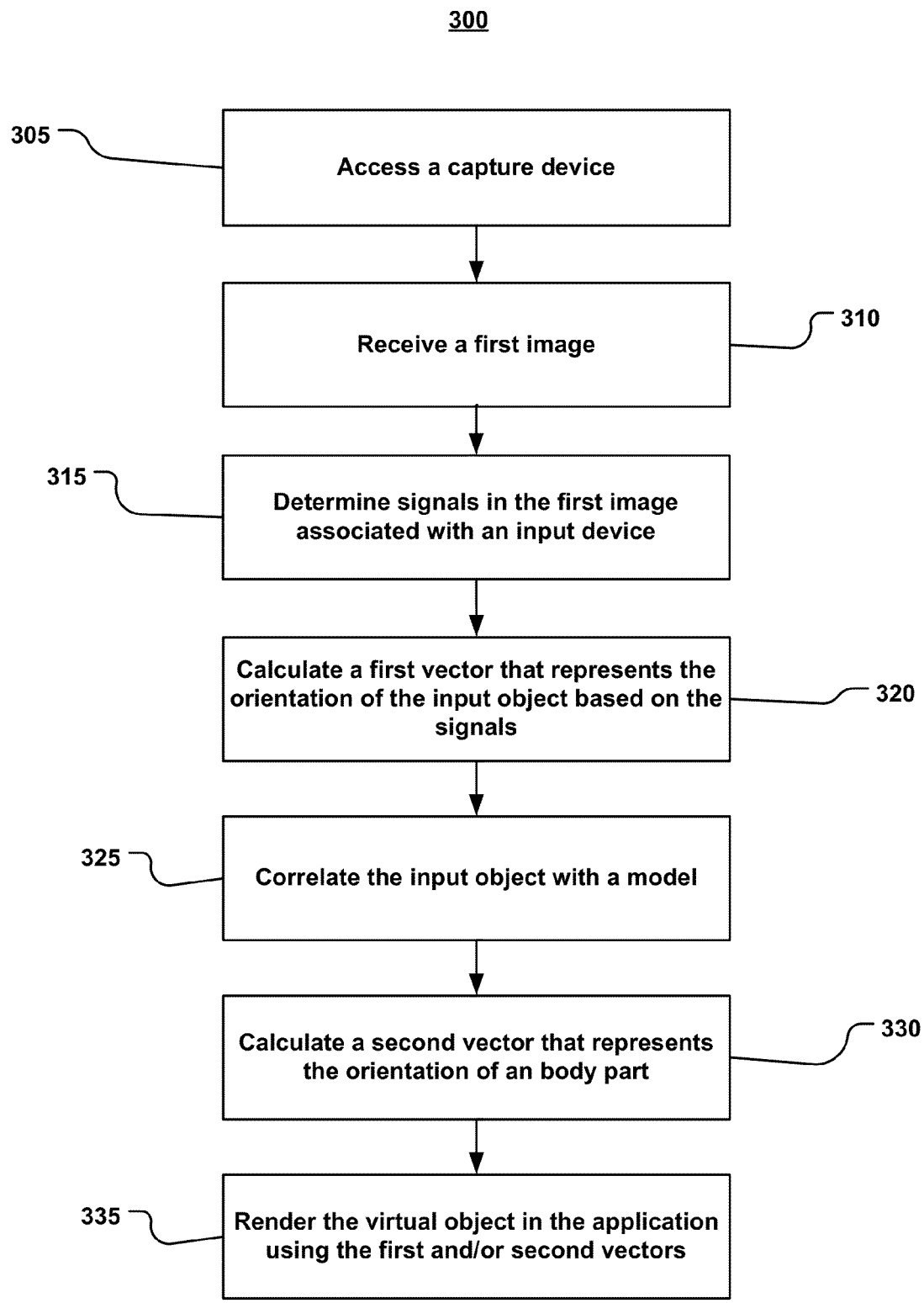
FIG. 9 depicts a flow diagram of an example method for processing image data of a scene that may be used to interpret input that a user provides through use of an input object.

FIG. 9 depicts a flow diagram of an example method 300 for processing image data, such as the first image shown in FIG. 7, of a scene that may be used to interpret input that a user provides through use of a virtual object. The example method 300 may be implemented using, for example, the capture device 20 and/or the computing environment 12 of the target recognition, analysis, and tracking system 10 described with respect to FIGS. 1A-8. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-8.

At 305, a capture device may be accessed. The capture device may be an RGB camera, an IR light component, a 3-D camera, a microphone, or any combination thereof.

At 310, a first image such as the first image 100 may be received from, for example, the capture device. In one embodiment, the first image may be an RGB image, an IR image, a depth image, or the like.

As described above, the first image may include the signals created by the indicators such as the indicators 60 described above with respect to FIGS. 6A and 6B that belong to the input device 55.

At 315, the first image may be analyzed to determine whether signals that may be included therein may represent the signals that were emitted and/or reflected from the indicators that belong to the input object. In one embodiment, to determine whether the first image includes the signals that have been emitted and/or reflect by the indicators that belong to the input object, the first image may be scanned in to discover bright spots, may be scanned to determine invalid depth values, or depth values that may not be observed or captured in the first image; or may be compared to against a pattern that may be used to emit signals as described above.

At 320, a first vector that represents the orientation of the input object 55 in the scene may be calculated. After determining that one or more signals associated with the indicators may be within the first image, the signals may be grouped together into a cluster that may then be used to generate a first vector that may indicate the orientation of the input object in the captured scene.

In one embodiment, when the cluster has been created, the signals within the cluster may be furthered analyzed in order to determine the x, y, and z coordinate values of each of the signals. Because the x, y, and z coordinate values may relate to a position within the first image, the coordinate values may be used to calculate a first vector. In calculating the first vector, the signals may be analyzed to draw a vector that may connect substantially all the signals within the cluster. In one embodiment, the signals may be scattered in such a manner that a single vector may not be able to include all the signals that are within the cluster. In these cases, a first vector may be drawn as a best fit vector in order to provide a vector estimate that would substantially include all the signals within the cluster.

At 325, a relation may be created between the input object and a model. In one embodiment, a second image may be analyzed to determine whether one or more objects in the scene correspond to a human target such as the user. The second image may be the same image captured by the capture device as the first image or a different image. For example, in one embodiment, the first image may be an IR image whereas the second image may be a depth image. Alternatively, both the first and second images may be the same depth image captured by the capture device.

In one embodiment, to determine whether a target or object within the second image corresponds to a human target, each of the targets, objects, or any part of the screen may be flood filled and compared to a pattern of a human body. Each target or object that matches the pattern may then be scanned to generate a model such as a skeletal model, a mesh human model, or the like associated therewith. When the model is generated, a relation between the model and the input object may be created such that the model may indicate the orientation of a body part of the with respect to the input object. For example, the first vector may be related to the model such that the model may be tracked in order to track the orientation of the arm the user grasps the input object with in the captured scene.

In yet another example embodiment, after generating the model, the model may be analyzed to determine at least one joint that correspond to the body part associated with the model. When a relative location of a joint corresponds to a relative location of the input object, the input object may be correlated with the model such that the model may and/or the input object may be tracked together.

At 330, a second vector may be calculated that may represent the orientation of body part including the input object. For example, the second vector may include the orientation of the joints associated with an arm of the model that may be grasping the input object.

In an example embodiment, the first and second vectors may be processed to determine the angle between the input object and the arm the user grasps the input object with. Upon generating the first and second vectors, the first and sectors may be combined in such a way as to determine the angle between the two vectors. This angle may correspond to the angle in the scene created by the orientation of the arm the user grasps the input object with and orientation of the input object.

At 335, a virtual object in the application may be rendered using the first and/or second vectors. The virtual object may be a virtual representation of the input object. In one embodiment, the first vector may be provided to the computing environment such that the computing environment may track the first vector, render a virtual object associated with the first vector, and/or determine which controls to perform in the application programs that are executing on the computing environment based on, for example, the first vector.

In another embodiment, the model and the first vector may then be provided to the computing environment such that the computing environment may track the model and the first vector and render an avatar associated with the model. Additionally, the computing environment may render a virtual object associated with the first vector, determine clothing, skin and other colors based on the corresponding RGB image, and/or determine which controls to perform in the application programs that are executing on the computing environment based on, for example, the model.

In yet another example embodiment, the first and second vectors may then be provided to the computing environment such that the computing environment may track the first and second vectors and render a virtual object associated with the first vector. Additionally, the computing environment may render an avatar associated with the second vector, and/or determine which controls to perform in the application programs that are executing on the computing environment based on, for example, the second vector.

In another example embodiment, the angle that may correspond to the angle in the scene created by the orientation of the arm the user grasps the input object with and orientation of the input object may be provided to the computing environment. In providing the angle to the computing environment, the computing environment may track the angle, render an avatar associated with the angle, render a virtual object associated with the angle, and/or determine which controls to perform in an application, such as application programs, executing on the computer environment based on, for example, the angle.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A computer-implemented method for processing an image of a scene, the computer-implemented method comprising:
receiving the image of the scene;
scanning the image for at least one signal reflected by an object;
grouping the at least one signal reflected by the object in a cluster;
calculating a first vector based on the cluster;
analyzing the first vector to determine a highest and lowest coordinate in a first direction along the first vector;
determining a delta distance from the first vector, the delta distance being determined by subtracting the lowest coordinate in the first direction along the first vector from the highest coordinate in the first direction along the first vector; and
calculating an angle of the object by comparing the delta distance to a known pixel distance of the object in the first direction, the angle of the object indicating an angle at which the object is leaning towards or away from a capture device in the scene.

2. The computer-implemented method of claim 1, wherein grouping the at least one signal into the cluster further comprises distinguishing the at least one signal from a false reading.

3. The computer-implemented method of claim 1, wherein grouping the at least one signal into the cluster further comprises analyzing a location of the at least one signal within the image.

4. The computer-implemented method of claim 3, wherein analyzing the location of the at least one signal further comprises preventing the at least one signal from being grouped in the cluster when a location associated with the at least one signal indicates that a relational distance has been exceeded.

5. The computer-implemented method of claim 1, wherein the first vector is a vector of best fit, and wherein a pixel location of the at least one signal is close to the first vector based on the vector of best fit.

6. The computer-implemented method of claim 1, wherein calculating the first vector based on the cluster further comprises analyzing a location of the at least one signal within the image to determine a highest x coordinate, a lowest x coordinate, a highest y coordinate, and a lowest y coordinate for the first vector.

7. The computer-implemented method of claim 1, wherein the first direction is a y direction, the delta distance is a delta height, the known pixel distance is a known pixel height, and the angle of the object is a pitch angle.

8. The computer-implemented method of claim 7, further comprising:
analyzing the first vector to determine whether the at least one signal that corresponds to a highest y coordinate is of a higher signal strength than the at least one signal that corresponds to a lowest y coordinate;
referencing the pitch angle to indicate that the object is leaning towards the capture device in the scene when the at least one signal that corresponds to the highest y coordinate is of a higher signal strength than the at least one signal that corresponds to the lowest y coordinate; and
referencing the pitch angle to indicate that the object is leaning away from the capture device in the scene when the at least one signal that corresponds to the highest y coordinate is of a lower signal strength than the at least one signal that corresponds to the lowest y coordinate.

9. The computer-implemented method of claim 1, wherein the first direction is an x direction, the delta distance is a delta width, the known pixel distance is a known pixel width, and the angle of the object is a yaw angle.

10. The computer-implemented method of claim 9, further comprising:
analyzing the first vector to determine whether the at least one signal that corresponds to a highest x coordinate is of a higher signal strength than the at least one signal that corresponds to a lowest x coordinate;
referencing the yaw angle to indicate that the object is leaning to the right of the capture device in the scene when the at least one signal that corresponds to the highest x coordinate is of a higher signal strength than the at least one signal that corresponds to the lowest x coordinate; and
referencing the yaw angle to indicate that the object is to the left of the capture device in the scene when the at least one signal that corresponds to the highest x coordinate is of a lower signal strength than the at least one signal that corresponds to the lowest x coordinate.

11. A computer-readable storage medium for processing an image of a scene, the computer-readable medium having stored thereon computer executable instructions comprising:
receiving the image of the scene;
scanning the image for at least one signal reflected by an object;
grouping the at least one signal reflected by the object in a cluster;
calculating a first vector based on the cluster;
analyzing the first vector to determine a highest and lowest coordinate in a first direction along the first vector;
determining a delta distance from the first vector, the delta distance being determined by subtracting the lowest coordinate in the first direction along the first vector from the highest coordinate in the first direction along the first vector; and
calculating an angle of the object by comparing the delta distance to a known pixel distance of the object in the first direction, the angle of the object indicating an angle at which the object is leaning towards or away from a capture device in the scene.

12. The computer-readable storage medium of claim 11, wherein the object is a user.

13. The computer-readable storage medium of claim 11, wherein the object is a non-human object.

14. The computer-implemented method of claim 1, wherein the object is a user.

15. The computer-implemented method of claim 1, wherein the object is a non-human object.

16. A system for processing an image of a scene comprising:
a capture device, the capture device for capturing the image of the scene;
a processor; and
memory having stored therein computer executable instructions comprising:

receiving the image of the scene;

scanning the image for at least one signal reflected by an object;

grouping the at least one signal reflected by the object in a cluster;

calculating a first vector based on the cluster;

analyzing the first vector to determine a highest and lowest coordinate in a first direction along the first vector;

determining a delta distance from the first vector, the delta distance being determined by subtracting the lowest coordinate in the first direction along the first vector from the highest coordinate in the first direction along the first vector; and calculating an angle of the object by comparing the delta distance to a known pixel distance of the object in the first direction, the angle of the object indicating an angle at which the object is leaning towards or away from a capture device in the scene.

17. The system of claim 16, wherein the object is a user.

18. The system of claim 16, wherein the object is a non-human object.

19. The system of claim 16, wherein the computer executable instructions further comprise:

analyzing the first vector to determine whether the at least one signal that corresponds to a highest y coordinate is of a higher signal strength than the at least one signal that corresponds to a lowest y coordinate;

referencing a pitch angle to indicate that the object is leaning towards the capture device in the scene when the at least one signal that corresponds to the highest y coordinate is of a higher signal strength than the at least one signal that corresponds to the lowest y coordinate; and referencing the pitch angle to indicate that the object is leaning away from the capture device in the scene when the at least one signal that corresponds to the highest y coordinate is of a lower signal strength than the at least one signal that corresponds to the lowest y coordinate.

20. The computer-readable storage medium of claim 11, wherein the computer executable instructions further comprise:

analyzing the first vector to determine whether the at least one signal that corresponds to a highest y coordinate is of a higher signal strength than the at least one signal that corresponds to a lowest y coordinate;

referencing a pitch angle to indicate that the object is leaning towards the capture device in the scene when the at least one signal that corresponds to the highest y coordinate is of a higher signal strength than the at least one signal that corresponds to the lowest y coordinate; and referencing the pitch angle to indicate that the object is leaning away from the capture device in the scene when the at least one signal that corresponds to the highest y coordinate is of a lower signal strength than the at least one signal that corresponds to the lowest y coordinate.

* * * * *